US012591215B2

(12) United States Patent (10) Patent No.: US 12,591,215 B2

Mansouri (45) Date of Patent: *Mar. 31, 2026

(54) SYSTEM AND METHOD FOR FORMING DENTAL APPLIANCES

(71) Applicant: SprintRay Inc., Los Angeles, CA (US)

(72) Inventor: Amir Mansouri, Los Angeles, CA (US)

(73) Assignee: SprintRay, Inc., Los Angeles, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/578,444

(22) Filed: Jan. 18, 2022

(65) Prior Publication Data

US 2022/0229414 A1 Jul. 21, 2022

Related U.S. Application Data

(63) Continuation of application No. 17/512,498, filed on Oct. 27, 2021.

(Continued)

(51) Int. Cl.
*G05B 19/4099* (2006.01)
*A61C 7/00* (2006.01)
(Continued)

(52) U.S. Cl.
CPC .......... *G05B 19/4099* (2013.01); *A61C 7/002* (2013.01); *A61C 7/08* (2013.01);
(Continued)

(58) Field of Classification Search
CPC ...... G05B 19/4099; G05B 2219/35134; G05B 2219/45145; G05B 2219/45167;
(Continued)

(56) References Cited

U.S. PATENT DOCUMENTS

2005/0082703 A1* 4/2005 Wrosz ..................... B29C 51/22
264/16
2005/0194282 A1* 9/2005 Kraimer ................. B65D 33/20
206/524.1

(Continued)

FOREIGN PATENT DOCUMENTS

JP H07149369 A * 6/1995

*Primary Examiner* — Thomas C Lee
*Assistant Examiner* — Michael Tang
(74) *Attorney, Agent, or Firm* — Jafari Law Group, Inc.

(57) ABSTRACT

The invention is a system and method for forming a dental appliance. A control module may be configured to receive data concerning a dental model and determine a toolpath for creating a pre-cut substrate based on the data. A cutting module may be configured to create the pre-cut substrate based on the toolpath. A forming module may be configured to apply a second substrate to the pre-cut thermoforming substrate received from the cutting module and form a dental appliance from the pre-cut substrate and the secondary substrate. The method may include receiving data concerning a dental model, determining a toolpath for cutting a substrate into a pre-cut thermoforming substrate based on the data, pre-cutting a first substrate based on the toolpath to form a pre-cut substrate, applying a second substrate to the pre-cut substrate, and thermoforming a dental appliance from the pre-cut substrate and the second substrate.

19 Claims, 5 Drawing Sheets

Related U.S. Application Data

(60) Provisional application No. 63/138,699, filed on Jan. 18, 2021.

(51) Int. Cl.

| | |
|---|---|
| *A61C 7/08* | (2006.01) |
| *B29C 51/14* | (2006.01) |
| *B29C 51/26* | (2006.01) |
| *B29L 31/00* | (2006.01) |

(52) U.S. Cl.
CPC ............ *B29C 51/14* (2013.01); *B29C 51/264* (2013.01); *B29L 2031/753* (2013.01); *G05B 2219/35134* (2013.01); *G05B 2219/45145* (2013.01); *G05B 2219/45167* (2013.01)

(58) Field of Classification Search
CPC ........... A61C 7/002; A61C 7/08; B29C 51/14; B29C 51/264; B29C 51/02; B29C 51/10; B29C 51/36; B29C 2791/006; B29C 2791/007; B29C 51/30; B29L 2031/753; B29L 2031/7536
USPC .............................................. 700/98; 433/24
See application file for complete search history.

(56) References Cited

U.S. PATENT DOCUMENTS

| | | | | |
|---|---|---|---|---|
| 2015/0374464 A1* | 12/2015 | Stewart | .................. | C09K 11/06 |
| | | | | 264/16 |
| 2018/0333224 A1* | 11/2018 | Van Esbroeck | ........ | B33Y 10/00 |
| 2018/0333226 A1* | 11/2018 | Tsai | ......................... | B29C 51/46 |
| 2020/0290262 A1* | 9/2020 | Aguilar Mendez | ..... | B29C 51/46 |
| 2021/0153978 A1* | 5/2021 | Parkar | ..................... | B29C 51/14 |
| 2021/0393385 A1* | 12/2021 | Parkar | .................. | A61C 19/063 |
| 2022/0346916 A1* | 11/2022 | Phan | ........................ | A61C 7/08 |

* cited by examiner

Prior Art:
CNC Cutting of
Prior Art Aligners

SYSTEM AND METHOD FOR FORMING DENTAL APPLIANCES

TECHNICAL FIELD OF THE INVENTION

The present invention relates generally to dental device manufacturing. More specifically, the present invention relates to a system and method for forming a dental appliance.

COPYRIGHT AND TRADEMARK NOTICE

A region of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Traditionally, methods for forming a dental appliance (for example, and without limitation, a retainer, an aligner, a bleaching tray, a night guard or the like) include three major steps, comprising obtaining a model of a patient's dental arch, which may be generally used as a thermoforming mold, thermal-forming the appliance (aligners, retainers, etc.), separating the appliance, cutting the appliance, and then polishing the appliance manually. This general process is very well known. Unfortunately, this process is very time consuming and can cause a bottleneck effect when mass-producing these types of products.

Some companies have tried to streamline this process, but those methods fall short and are inadequate. For example, in some methods, implementation of some automation to the known process of creating aligners includes automating the cutting process. Typically, this automated cutting involves using 4-axis and 5-axis milling machines. Essentially when the appliance is formed, models of the dental arch are loaded into a CNC mill and cut machine. Some others use laser cutting devices on a 4-axis or 5-axis machine to cut the aligners. Despite these efforts, these prior art systems and methods fall short during mass-production.

Therefore, there is a need for a system and method that addresses these shortcomings, and it is to these ends that the present invention has been developed.

BRIEF SUMMARY OF THE INVENTION

According to the present invention, a system and method is described for forming a dental appliance. A dental appliance in accordance with he present invention may be any type of dental appliance, including an orthodontic appliance, or other type of dental devices such as, without limitation, a retainer, an aligner, a bleaching tray, a night guard, or any other type of dental device that may be formed using a dental mold.

Generally, the invention involves a system and method for forming an appliance. The system may include a control module configured to receive data concerning a dental model and determine a toolpath for creating a pre-cut substrate based on the data. A cutting module may be coupled to or in communication with the control module and may be configured to create a pre-cut substrate based on the toolpath. Furthermore, a forming module may be configured to apply a second substrate to the pre-cut thermoforming substrate received from the cutting module and form a dental appliance from the pre-cut substrate and the secondary substrate. The method may include receiving data concerning a dental model, determining a toolpath for cutting a substrate into a pre-cut thermoforming substrate based on the data, pre-cutting a first substrate based on the toolpath to form a pre-cut substrate, applying a second substrate to the pre-cut substrate, and thermoforming an appliance from the pre-cut substrate and the second substrate.

In some exemplary embodiments, the system may include: a control module, including a memory and a processor with one or more executable instructions configured to: receive data concerning a dental model; and determine a toolpath for cutting a substrate into a pre-cut thermoforming substrate based on the data; a cutting module, in communication with the control module, the cutting module configured to create the pre-cut thermoforming substrate based on the toolpath; and a forming module configured to: apply a secondary thermoforming substrate to the pre-cut thermoforming substrate received from the cutting module; and form a dental appliance from the pre-cut thermoforming substrate and the secondary thermoforming substrate.

In some exemplary embodiments, the method may include: receiving data concerning a dental model; determining a toolpath for cutting a substrate into a pre-cut thermoforming substrate based on the data; pre-cutting a first substrate based on the toolpath to form a pre-cut substrate; applying a second substrate to the pre-cut substrate; and thermoforming a dental appliance from the pre-cut substrate and the second substrate.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

DESCRIPTION OF THE INVENTION

Figure 1A:
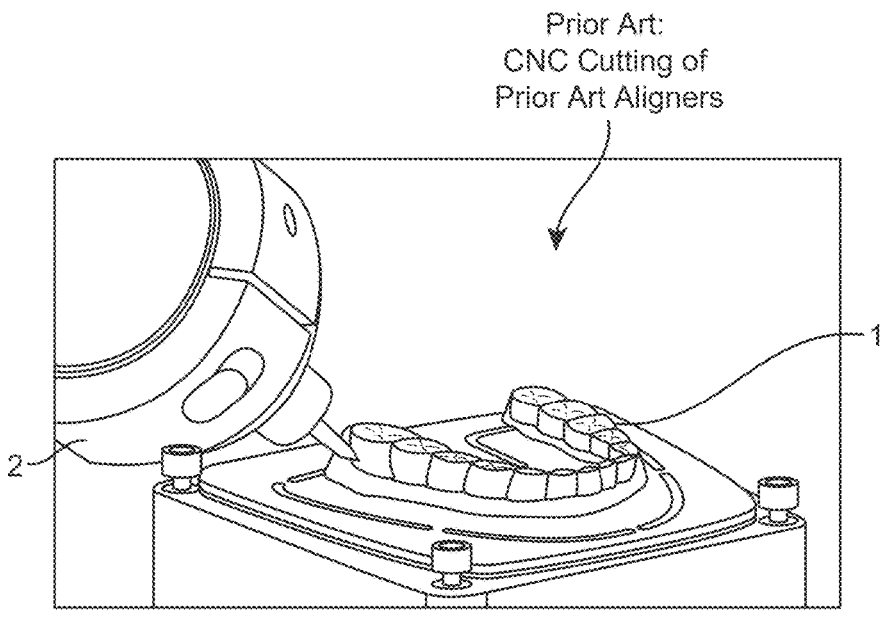
FIG. 1A is an image of a prior art CNC cutting device for prior art aligners.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps. For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

Turning now to the figures, FIG. 1A is an image of a prior art CNC cutting device for prior art aligners. With these prior art methods, a model of a patient's dental arch is obtained, which may be generally used as a thermoforming mold for thermal forming a dental appliance such prior art aligner 1. Once the aligner 1 is formed, it is separated from the model by cutting the aligner 1 with, for example, a CNC cutting tool 2. Typically, subsequent to the cutting, and once separated from the mold, the aligner 2 may be polished manually. Unfortunately, this process is very time consuming and can cause a bottleneck effect when mass-producing these types of products.

The prior art shortcomings are addressed by the present invention. Generally, the invention involves a system and method for forming a dental appliance. The term dental appliance in accordance with the present invention may refer to a wide range of dental products that may be formed using a dental mold. For example, and without limiting the scope of the present invention, dental appliance may refer to an orthodontic appliance, such as a retainer, an aligner, or the like. Moreover, the term dental appliance may also refer to a bleaching tray, a night guard, or any other type of dental device that may be formed using a dental mold. The system may include a control module configured to receive data concerning a dental model and determine a toolpath for creating a pre-cut substrate based on the data. A cutting module in communication with the control module may be configured to create a pre-cut substrate based on the toolpath. This pre-cutting of the substrate differs from the prior art in that the cutting process is performed on the substrate prior to the application of the substrate over the dental model, or otherwise during a two-dimensional (2D) stage or state of the substrate. Thus, unlike the prior art methods, the cutting process is performed prior to thermoforming the orthodontic appliance. This pre-cutting step allows for a large number of 2D pre-cut substrates to be produced, ready for thermoforming, and to be deployed in a large-scale manufacturing operation. In exemplary embodiments of the present invention, as mentioned further below, these 2D precut substrates can be introduced to a forming module, in which the dental model is also introduced, for the thermoforming process. The forming module may be configured to apply a second substrate to the pre-cut thermoforming substrate received from the cutting module and form an orthodontic or dental appliance from the pre-cut substrate and the secondary substrate. The method may include receiving data concerning a dental model, determining a toolpath for cutting a substrate into a pre-cut thermoforming substrate based on the data, pre-cutting a first substrate based on the toolpath to form a pre-cut substrate, applying a second substrate to the pre-cut substrate, and thermoforming a dental appliance from the pre-cut substrate and the second substrate.

Figure 1B:
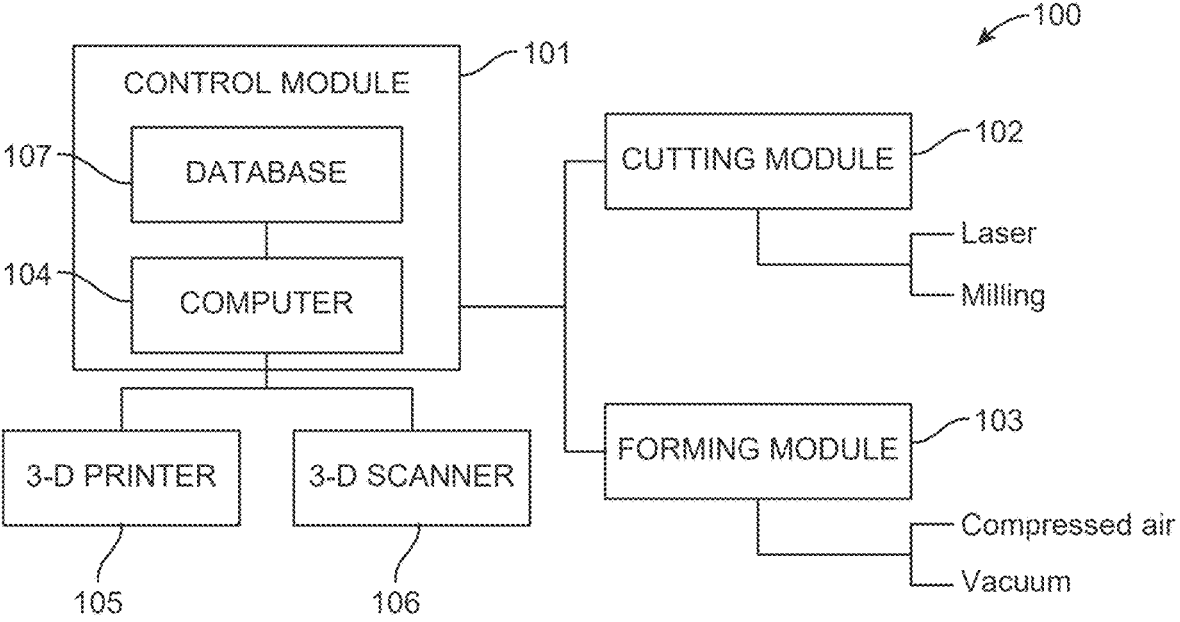
FIG. 1B is a block diagram for a system in accordance with some exemplary embodiments of the present invention.

Turning now to the next figure, FIG. 1B is a block diagram for a system in accordance with some exemplary embodiments of the present invention. More specifically, FIG. 1B depicts a block diagram of system 100 in accordance with some exemplary embodiments of the invention. System 100 may include a control module 101, a cutting module 102, and a forming module 103.

The control module 101 typically includes a computer 104 with processing power and configured to communicate with the cutting module 102 and forming module 103. The control module 101 may include a three-dimensional (3D) printer 105 and or a 3D scanner 106. The 3D printer 105 may be configured to print dental models suitable for preparing or forming a dental appliance in accordance with the present invention. In some exemplary embodiments, a 3D scanner may be employed by system 100 so that dental impressions of a patient may be scanned. The 3D scanner may provide data to the computer concerning the dental impression, which may be stored in a database 107 of the control module 101. Similarly, if a 3D printer is used, the database 107 may be the source and or repository of the data concerning the model. The model data may be of course used in determining a toolpath for the cutting module to implement during a cutting procedure, as will be discussed further below.

The cutting module 102 may employ any technology suitable for performing cuts on a 2D substrate. For example, and without limiting the scope of the present invention, the cutting module 102 may include laser cutting technology or milling technology for cutting the pre-cut substrate. The toolpath, as will be discussed below in more detail, may be determined by the control module 101, or may be received from another source and stored in a database of the control module 101.

The forming module 103 may employ any technology suitable for thermoforming articles such as orthodontic appliances. In some exemplary embodiments, the forming module 103 may include a compressed air apparatus for creating a positive pressure during the thermoforming process in order to form the orthodontic appliance. Typically, a dental model is introduced to the forming module 103 in order to align the dental model, a first substrate, which is a pre-cut substrate generated by the cutting module 102, and a second substrate, which is an additional layer sandwiching the pre-cut substrate between the second substrate and the dental model. In some exemplary embodiments, the forming module 103 may include a vacuum system for creating a negative pressure during the thermoforming process in order to form the orthodontic appliance.

Figure 2:
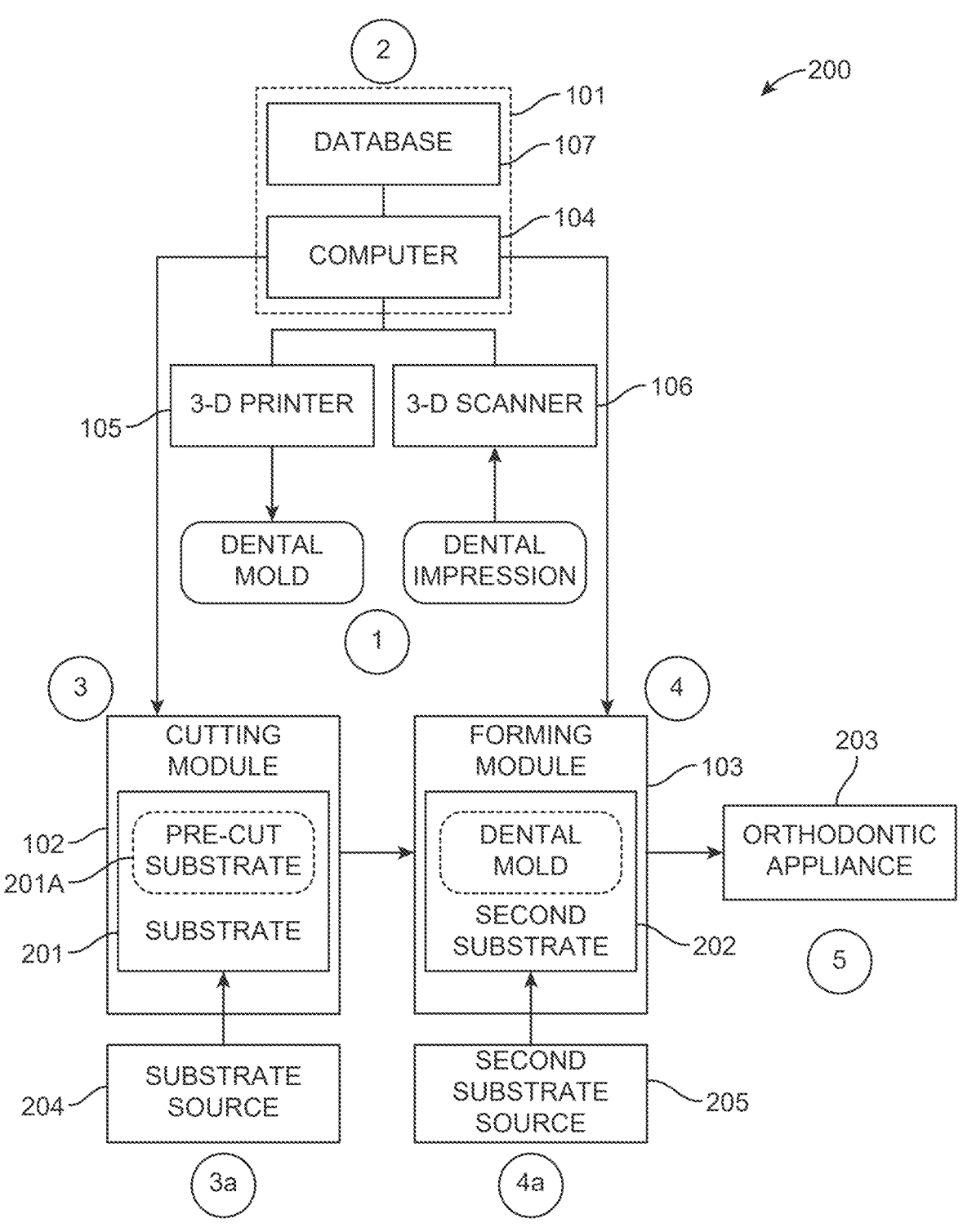
FIG. 2 illustrates a system and method in accordance with some exemplary embodiments of the present invention.

FIG. 2 illustrates a system and method in accordance with some exemplary embodiments of the present invention. More specifically, FIG. 2 depicts system 200 in accordance with some exemplary embodiments of the invention, which employs exemplary method 1-5.

System 200 is similar to system 100 and may similarly include a control module 101, a cutting module 102, and a forming module 103. The control module 101 typically includes a memory and a processor with one or more executable instructions configured to: receive data concerning a dental model; and determine a toolpath for cutting a substrate 201 into a pre-cut thermoforming substrate 201A based on the data. The cutting module 102, which is in communication with the control module 101, may be configured to create the pre-cut thermoforming substrate 201A based on the toolpath. The forming module 103, which is configured to receive a dental model in preparation for the thermoforming procedure, is further configured to: apply a secondary thermoforming substrate 202 on top of the pre-cut thermoforming substrate 201A received from the cutting module 102; and form a dental appliance—for example and without limitation—an orthodontic appliance 203, from the pre-cut thermoforming substrate 201A and the secondary thermoforming substrate 202.

In some exemplary embodiments, the method may include: (1) receiving data concerning a dental model—this may comprise receiving data from a database of the control module 101 concerning a dental model that has been provided from an external source, or data from the database of the control module 101 concerning a dental model that has been 3D-printed by a 3D printer of system 200, or data received from a 3D scanner of the control module 101, wherein the 3D scanner receives a dental impression of a patient. Moreover, in step (2), a toolpath for cutting a substrate into a pre-cut thermoforming substrate based on the data may be determined and the information forwarded to the cutting module 102. In step (3), a first substrate may be used to generate or cut a pre-cut substrate based on the toolpath. To facilitate the manufacturing of multiple pre-cut substrates, at step (3a), a substrate source 204 may be introduced into the cutting module 102, such as a continuous roll of substrate sheets that may be fed into the cutting module 102. As one pre-cut substrate is cut from a substrate sheet roll, the excess substrate may be discarded from the cutting module 102 for recycling, and a new substrate portion may be prepared for the following pre-cut cycle.

In step (4) the pre-cut substrate is forwarded to the forming module 103, where a second substrate 205 is applied to the pre-cut substrate 201A—moreover, a dental mold 206 is received by the forming module 103 and the used in the thermoforming procedure, which sandwiches the pre-cut substrate 201A between the second substrate 202 and the dental mold 206. To facilitate the manufacturing of multiple thermoformed orthodontic appliances, at step (4a), a second substrate source 205 may be introduced into the forming module 103, such as a continuous roll of second substrate sheets that may be fed into the forming module 103. As one dental appliance is thermoformed, and excess second substrate material is cut from a second substrate sheet roll, the excess substrate may be discarded from the forming module 103 for recycling, and a new second substrate portion may be prepared for the following thermoforming cycle.

In step (5), the forming module 103 concludes a thermoforming cycle, and a dental appliance is produced, for example orthodontic appliance 203.

Figure 3A:
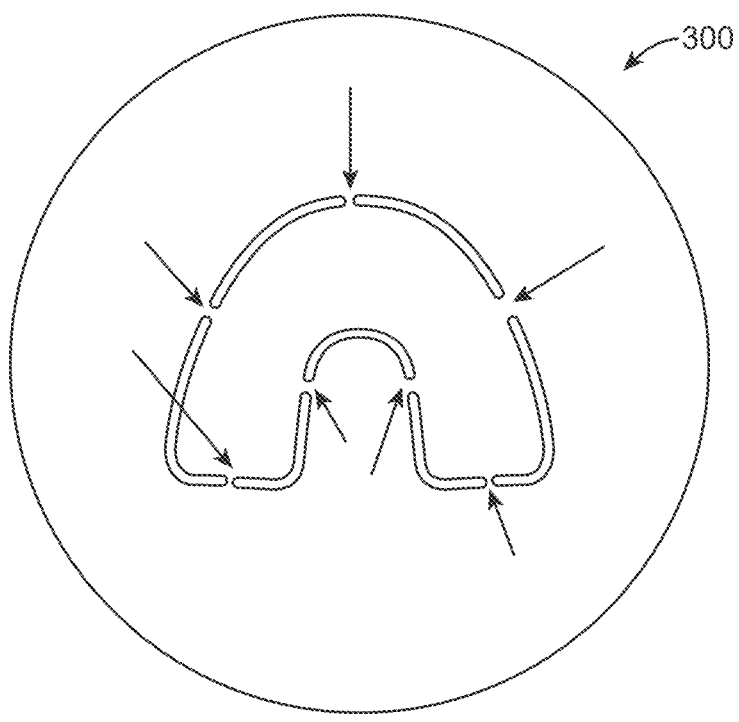
FIG. 3A illustrates a substrate prepared for a thermoforming procedure in accordance with some exemplary embodiments of the present invention.
Figure 3B:
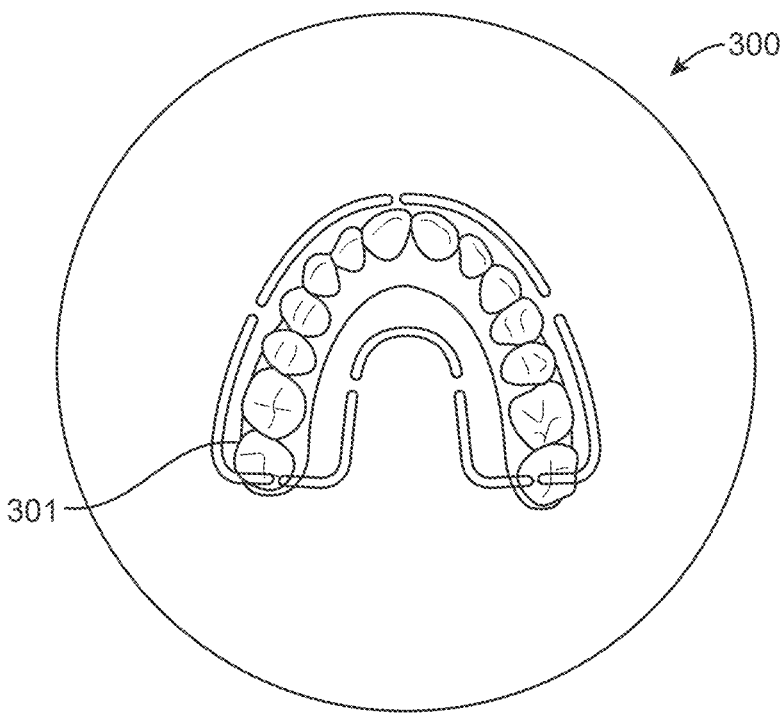
FIG. 3B illustrates a model of a dental arch below a substrate prepared for a thermoforming procedure in accordance with some exemplary embodiments of the present invention.

Turning now to the next set of figures, FIG. 3A illustrates a substrate prepared for a thermoforming procedure in accordance with some exemplary embodiments of the present invention, and FIG. 3B illustrates a model of a dental arch below a substrate prepared for a thermoforming procedure in accordance with some exemplary embodiments of the present invention. More specifically, these figures show substrate 300, which may be a material such as a plastic that is suitable for thermoforming a dental appliance in accordance with the present invention From the first view, it may be appreciated that in exemplary embodiments, the thermoforming substrates can comprise of plastics, which may be provided in circular or rectangular 2D sheets. As may be appreciated in FIG. 3A, cutting the thermoforming sheet in 2D may include cutting along a predetermined toolpath that is based on or aligns with a corresponding dental model of a patient's dental arch. The cutting must be precise. For example, in creating a dental appliance such as an aligner, typically the toolpath must be along the gumline of the dental model representing the dental arch of the patient. Moreover, in exemplary embodiments, some of the areas along the toolpath, for example along a gum line region, may be intentionally left uncut (i.e. see the interruptions shown by the arrows in FIG. 3A). These interruptions along the cut line of the pre-cut substrate may be used as a means to support or hold the shape of the substrate assembly that is introduced in the forming module 103 for the thermoforming process.

The second view of FIG. 3B, illustrates a model of a dental arch, or dental model 301, situated below a substrate that has been pre-cut. The model, the pre-cut substrate, and, as will be discussed further below, a second substrate, will form the substrate assembly that is introduced in the forming module 103 for the thermoforming process.

Figure 4:
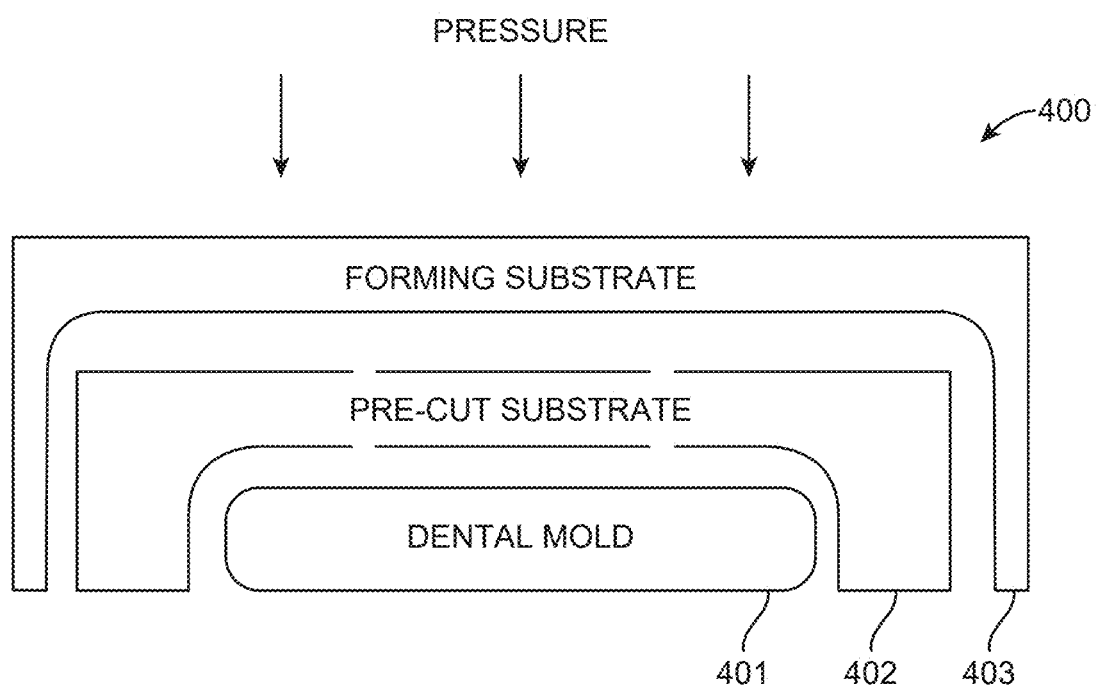
FIG. 4 illustrates components used for forming a dental appliance during an exemplary thermoforming procedure in accordance with some embodiments of the present invention.

FIG. 4 illustrates a substrate assembly used for forming a dental appliance during an exemplary thermoforming procedure in accordance with some embodiments of the present invention. More specifically, FIG. 4 depicts substrate assembly 400, which generally includes a dental mold 401, which is covered by a first layer of a substrate 402 that has been cut such as a pre-cut substrate generated in a cutting module 102 in accordance with the present invention, and a second substrate 403, which may form the semi cut plastic on top of the dental mold 401 in a thermoforming machine of the forming module 103. The second substrate 403 should comprise of a thermoplastic polymer, and in exemplary embodiments, the thermoplastic polymer may be a Polymethylpentene copolymer such as, but in no way limiting the scope of the present invention, TPX® from Mitsui Chemicals. Inc.

As may be gleaned from FIG. 4, arrows indicate a pressure, which depending on the configuration of the thermoforming apparatus of the forming module 103 employed, may comprise of positive pressure (e.g. from compressed air) or negative pressure (e.g. from a vacuum) to form the plastic on the mold. In exemplary embodiments, because some regions of the first substrate are cut during the pre-cut process, the first substrate won't seal completely on top of the model, hence the use of the second substrate layer. In exemplary embodiments, the forming module 103 uses temperature to get the plastic into a glass transition zone, then employs the positive pressure or negative pressure to form the orthodontic appliance on top of the mold.

Figure 5:
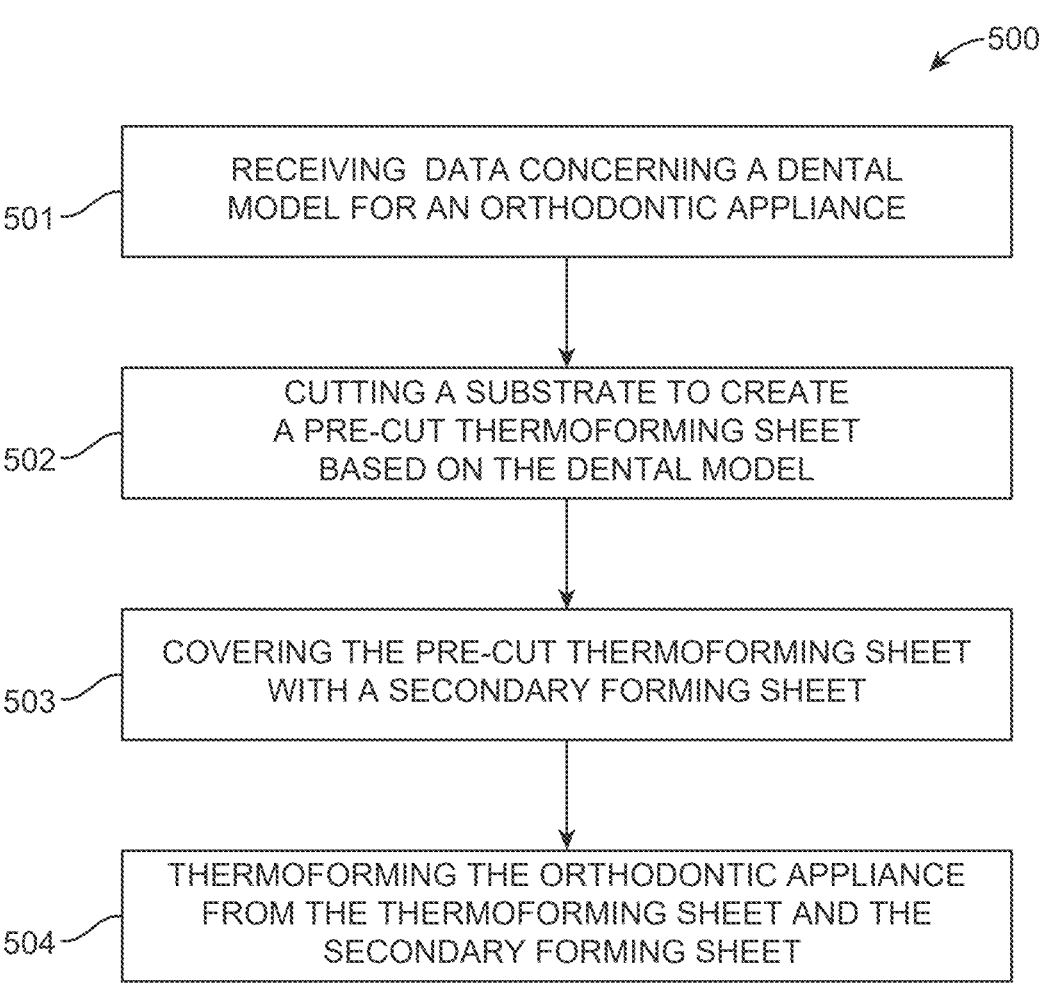
FIG. 5 is a flow chart of a method in accordance with some exemplary embodiments of the present invention.

FIG. 5 is a flow chart of a method in accordance with some exemplary embodiments of the present invention. More specifically, FIG. 5 depicts a flowchart of method 500 for forming a dental appliance. Although a certain number in a certain sequence of steps is presented, it is understood that other sequence of similar steps and less or more steps may be performed without deviating from the scope of the present invention.

In step 501, data concerning a dental model may be received. In step 502, a toolpath for cutting a substrate into a pre-cut thermoforming substrate may be determined based on the data. In step 503, a first substrate based on the toolpath may be cut to form a pre-cut substrate. In step 504, a substrate assembly may be formed, wherein the substrate assembly comprises the pre-cut substrate situated on top of the dental model, and a second substrate situated on top of the pre-cut substrate. Once the substrate assembly is assembled, in step 505, a dental appliance may be thermoformed.

A person of ordinary skill in the art will appreciate that the systems and methods described above may very well be suitable for thermoforming other types of devices within and outside of the dental field. As such, the description with reference to dental appliances should not be limiting, and it is understood that other devices or tools may be thermoformed using the systems and methods of the present invention.

A system and method for forming a dental appliance has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A method for forming a dental appliance comprising:
receiving an outline of the dental appliance;
applying the outline to a substrate wherein the outline defines a first portion of the substrate within the outline and a second portion of the substrate outside the outline, the substrate including a substrate uppermost top surface and a substrate lowermost bottom surface opposite the substrate uppermost top surface;
cutting the substrate along a portion of the outline while leaving the first portion of the substrate connected to the second portion of the substrate to form a partially cut substrate, wherein at least a portion of the cutting the substrate includes cutting entirely through the substrate from the substrate uppermost top surface to the substrate lowermost bottom surface;
using the second portion to support the first portion during a thermoforming process to form the dental appliance;

wherein the dental appliance includes an appliance underneath surface adapted to directly engage a user's teeth when worn and an appliance uppermost surface opposite the appliance underneath surface and adapted to be exposed to an interior of the user's mouth when worn;

wherein the substrate uppermost top surface forms at least a portion of the appliance uppermost surface and the substrate lowermost bottom surface forms at least a portion of the appliance underneath surface.

2. The method of claim 1, wherein receiving the outline comprises receiving the outline from a database of a control module concerning a dental model that has been 3D-printed by a 3D printer, or data received from a 3D scanner of the control module.

3. The method of claim 1, further comprising providing a continuous substate source to facilitate forming multiple partially cut substrates.

4. The method of claim 3, wherein the continuous substate source to facilitate forming multiple partially cut substrates comprises of a continuous roll of thermoforming substrate sheets.

5. The method of claim 1, wherein the thermoforming process includes thermoforming an orthodontic appliance.

6. The method of claim 1, wherein the substrate comprises a plastic material.

7. The method of claim 6, wherein the plastic material comprises of a Polymethylpentene copolymer.

8. The method of claim 1, further comprising providing the substrate as a rectangular sheet.

9. The method of claim 1, further comprising providing the substrate as a circular sheet.

10. The method of claim 1, wherein the thermoforming process comprises employing a positive pressure.

11. The method of claim 10, wherein employing the positive pressure includes employing compressed air.

12. The method of claim 1, wherein the thermoforming process comprises employing a negative pressure.

13. The method of claim 12, wherein employing the negative pressure includes employing a vacuum.

14. The method of claim 1, wherein the thermoforming process comprises:

applying a suitable temperature so that the substrate reaches a glass transition zone.

15. The method of claim 14, further comprising:

subsequent to applying a suitable temperature so that the substrate reaches the glass transition zone, employing a positive pressure to form the dental appliance on top of the mold.

16. The method of claim 14, further comprising:

subsequent to applying a suitable temperature so that the substrate reaches the glass transition zone, employing a negative pressure to form the dental appliance on top of the mold.

17. The method of claim 1, wherein the outline is a closed loop.

18. The method of claim 1 wherein the thermoforming process includes:

applying the partially cut substrate to a dental mold;

applying a forming substrate to the partially cut substrate; and thermoforming the partially cut substrate using the dental mold to form the dental appliance;

wherein the forming substrate is entirely separate from the dental appliance.

19. The method of claim 18 wherein the dental appliance comprises the first portion of the substrate.

* * * * *